United States Patent [19]

Winkler

[11] 4,072,970
[45] Feb. 7, 1978

[54] STILL CAMERA

[75] Inventor: Alfred Winkler, Munich, Germany

[73] Assignee: AGFA-Gevaert Aktiengesellschaft, Leverkusen, Germany

[21] Appl. No.: 698,743

[22] Filed: June 22, 1976

[30] Foreign Application Priority Data

June 25, 1975 Germany .............................. 2528221

[51] Int. Cl.² .............................................. G03B 17/04
[52] U.S. Cl. ...................................... 354/187; 354/288
[58] Field of Search ................ 354/187, 188, 189–194, 354/288

[56] References Cited

U.S. PATENT DOCUMENTS

| 148,019 | 3/1874 | Agren | 354/187 |
| 2,208,797 | 7/1940 | Kende | 354/187 |

FOREIGN PATENT DOCUMENTS

| 330,123 | 6/1903 | France | 354/187 |

*Primary Examiner*—John Gonzales
*Attorney, Agent, or Firm*—Peter K. Kontler

[57] ABSTRACT

A still camera wherein two sections of the camera body are connected to each other by hinges so that one section can be pivoted between a first position in which the two sections are disposed end-to-end and the camera body resembles a small elongated brick which can be readily stored in a pocket or purse, and a second position in which the one section overlies the other section and its picture taking lens is in register with a light-admitting opening of the other section. Permanent magnets are used to releasably hold the one section in the first or second position. An auxiliary shutter is used to prevent entry of light into a film chamber of the other section when the one section is held in the first position; such auxiliary shutter opens in automatic response to actuation of the camera release and remains open during the making of an exposure.

27 Claims, 6 Drawing Figures

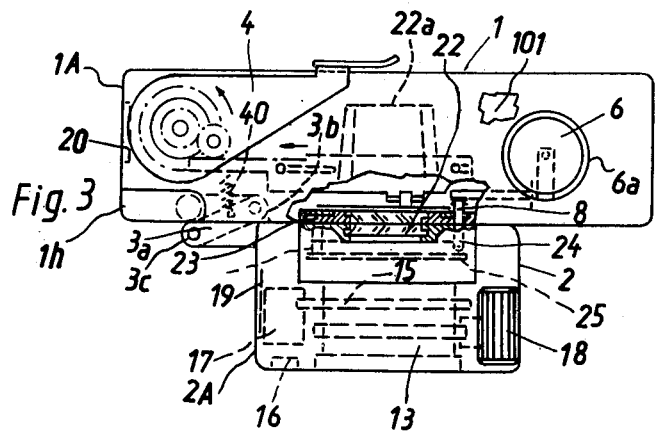
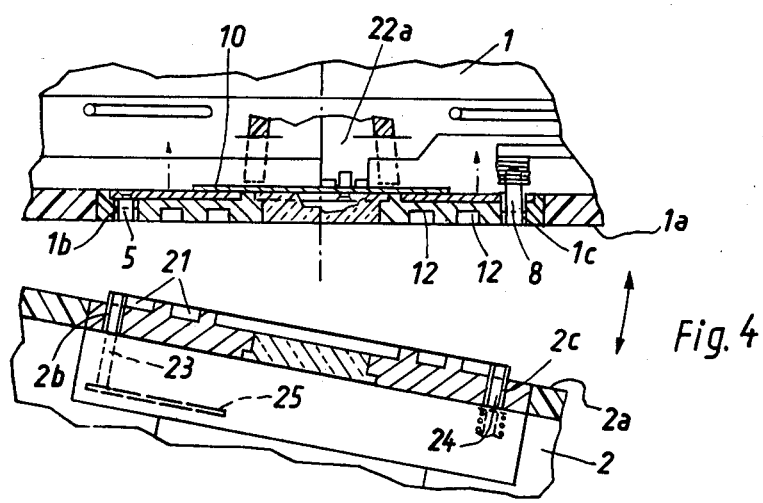

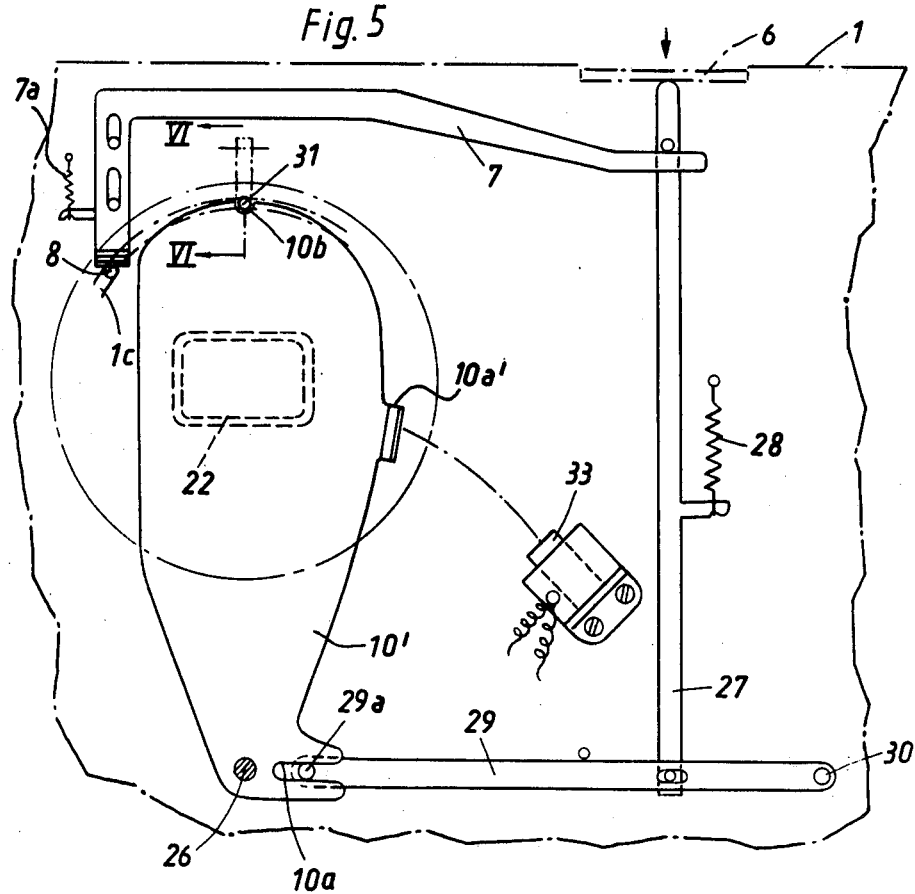
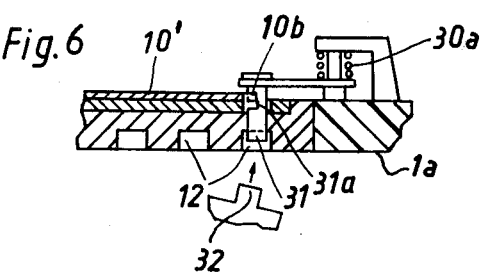

STILL CAMERA

BACKGROUND OF THE INVENTION

The present invention relates to photographic apparatus in general, and more particularly to improvements in still cameras. Still more particularly, the invention relates to improvements in still cameras of the type wherein the dimensions of the camera housing or body can be changed, i.e., wherein the camera body assumes a first size and/or shape when the apparatus is ready for use and a second size and/or shape when the apparatus is ready for storage.

In certain presently known still cameras, the camera body consists of two sections which are slidably telescoped into each other. One of the sections contains the picture taking lens and the other section contains the view finder. In order to prepare the camera for the taking of a first picture, one of the sections must be moved from a retracted to an extended position and such movement of the one section results in cocking of the shutter and/or transport of the film by the length of a frame. Upon completion of the first exposure, the one section must be moved back to the retracted position and thereupon again to the extended position in order to prepare the camera for the making of the next picture. As a rule, the camera comprises one or more springs which urge the one section to the extended position, and means for locking the one section in the retracted position in which the camera is ready for storage in a small area. A drawback of such cameras is that the movement of one section to and back from the retracted position between the making of successive exposures takes up much time and that the movement of one section to retracted position must be performed against the resistance of the aforementioned spring or springs. Furthermore, the operative connections between the movable section and the shutter cocking and/or film advancing mechanisms are complex and prone to malfunction.

SUMMARY OF THE INVENTION

An object of the invention is to provide a novel and improved still camera wherein the dimensions of the camera body can be changed without resorting to a telescopic connection between the sections.

Another object of the invention is to provide a still camera whose body can be stored in a small area when the camera is not in use in spite of the fact that the camera is equipped with a picture taking lens of substantial focal length.

A further object of the invention is to provide novel and improved means for connecting the sections of the camera body to each other and for holding the sections in selected positions with respect to each other.

An additional object of the invention is to provide a still camera which can be readily stored in a small case, pocket or purse in spite of the fact that the camera can accept standard cassettes or rolls for photographic film.

Still another object of the invention is to provide a camera which is of eye-pleasing appearance in use as well as when in condition for storage, which can be manipulated by novices with a minimum of instruction, and which requires a minimum of manipulation and the exertion of a negligible force between the making of successive exposures.

The invention is embodied in a photographic apparatus, especially in a still camera, which comprises a camera body including a first section and a second section each having a first side and a second side adjacent to the respective first side, one or more hinges or analogous means for articulately connecting the sections with each other so that one of the sections is movable with respect to the other section between a first position in which the first sides are adjacent to each other and the two sections together form an elongated brick-shaped body which can be readily stored in a small case, purse or pocket and a second position in which the second sides of the two sections are adjacent to each other, and means for releasably holding the one section in at least one of its first and second positions. Such holding means can include a first set of permanent magnets having opposite polarities and located at the first sides of the two sections to attract the first side of the one section to the first side of the other section in the first position of the one section, and a second set of permanent magnets having opposite polarities and disposed at the second sides of the two sections to attract the second side of the one section to the second side of the other section in the second position of the one section. The picture taking lens can be mounted in the one section and the other section then includes a film chamber and an opening which serves to admit scene light to the chamber and is located behind the lens in the second position of the one section. The camera is preferably further provided with an auxiliary shutter or analogous means for sealing the opening in the first position of the one section; such sealing means can be moved to an inoperative position in automatic response to movement of the one section to the second position or in response to actuation of a release for the shutter which enables scene light to reach an unexposed film frame behind the light-admitting opening.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a plan view of the still camera as seen in the direction of arrow III shown in FIG. 2;

FIG. 4 is an enlarged fragmentary horizontal sectional view showing the one section during movement between the first and second positions;

FIG. 5 is a fragmentary schematic front elevational view of the other section of the camera body, showing the auxiliary shutter in the operative position; and FIG. 6 is a sectional view as seen in the direction of arrows from the line VI—VI of FIG. 5.

DESCRIPTION OF THE PREFERRED EMBODIMENTS

Figure 1:
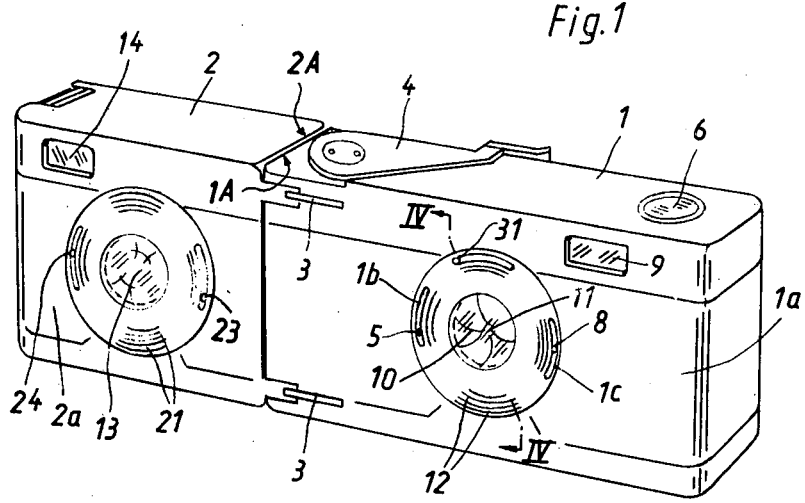
FIG. 1 is a perspective view of a still camera which embodies the invention, with the one section shown in the first position in which the camera is ready for storage.
Figure 2:
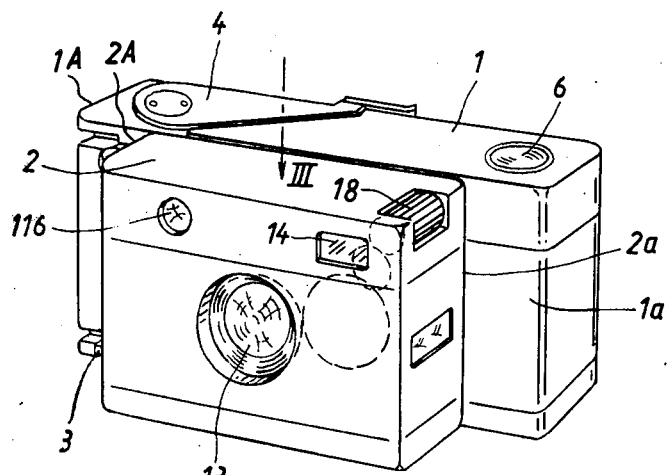
FIG. 2 is a perspective view of the still camera of FIG. 1, showing the one section in the second position in which the camera is ready for the taking of pictures.

The still camera of FIGS. 1 to 3 comprises a camera body or housing consisting of two discrete elongated block-shaped sections 1 and 2 which are articulately connected to each other by means of two hinges 3. The sections 1 and 2 respectively comprise relatively small first sides or end faces 1A, 2A and relatively large second sides or surfaces 1a, 2a. The common pivot axis of the hinges 3 is located in the region where the sides 1a, 1A and 2a, 2A meet. The height (as measured in the direction of the pivot axis defined by the hinges 3) and the thickness (as measured at right angles to the side 1a) of the section 1 preferably matches the height and thickness of the section 2. The section 1 is somewhat longer than the section 2. The area of the side 1A is preferably identical with or closely approximates that of the side 2A. The area of the side 1a is larger than that of the side 2a.

The section 1 and/or 2 is pivotable with respect to the section 2 and/or 1 between a first position which is shown in FIG. 1 and in which the sides 1A, 2A are immediately adjacent to each other whereby the camera body resembles a thin, flat elongated brick which can be readily stored in a small case, pocket or purse. The side 1a is then flush or substantially flush with the side 2a, and the side 1A completely or nearly completely overlies the side 2A, i.e., the sections 1, 2 are disposed end-to-end.

The section 1 and/or 2 is further pivotable with respect to the section 2 and/or 1 to a second position which is shown in FIGS. 2 and 3. In the second position, the sides 1a, 2a of the sections 1, 2 are immediately adjacent to each other and the sides 1A, 2A are exposed. The camera is then ready for the taking of one or more pictures.

The means for releasably holding the sections 1, 2 in the positions shown in FIG. 1 comprises two permanent magnets 19, 20 of opposite polarity (see FIG. 3) which are respectively embedded in the sides 2A, 1A and attract each other as soon as the side 1A is moved sufficiently close to the side 2A or vice versa. The camera further comprises means for releasably holding the sections 1 and 2 in the positions shown in FIGS. 2 and 3; such holding means comprises two permanent magnets 12, 21 of opposite polarity. The magnet 12 is mounted at the front side 1a of the section 1 and has concentric grooves and projections or ribs which alternate with the grooves and surround a light-admitting opening 22 (see particularly FIG. 5) in the front panel of the section 1. The magnet 21 is mounted at the side 2a of the section 2 and also includes concentric grooves and ribs which surround the rear end of a picture taking lens 13 in the section 2. When the sections 1, 2 assume the positions shown in FIGS. 2 and 3, the grooves of the magnet 12 receive the ribs of the magnet 21 and vice versa, whereby the magnets 12, 21 form a labyrinth seal which prevents light from penetrating into the opening 22 by passing between the neighboring sides 1a, 2a of the two sections. Moreover, the two magnets attract each other to yieldably or releasably retain the sections 1, 2 in the positions shown in FIGS. 2–3.

The section 1 is formed with a film chamber 101 (FIG. 3) which can receive scene light by way of the opening 22 and serves to accommodate a cassette (not shown) or a supply spool and a takeup spool with a photographic film between and on the cores of such spools. The foremost unexposed film frame is moved behind the opening 22, i.e., behind a light duct or channel 22a in the section 1, in response to actuation of a pivotable lever 4 which is mounted on the section 1 and forms part of the film transporting mechanism. The lever 4 can further serve to cock a shutter 25 which can open in response to actuation of a camera release having a membrane 6 mounted in a frame 6a which is recessed into the top panel of the section 1. The shutter 25 is mounted in the section 2 (see FIG. 3) and its opening results in exposure to light of the foremost unexposed film frame behind the aforementioned light duct 22a in the section 1. The means for cocking the shutter 25 in response to pivoting of the lever 4 in a direction to transport the film in the chamber 101 by the length of a frame comprises a pin 5 which is movable in an arcuate slot 1b at the front side 1a of the section 1 (see FIG. 1). The means for opening the shutter 25 in response to deformation of the membrane 6 comprises a link 7 (FIG. 5) which is biased upwardly by a spring 7a and can displace a release pin 8 in an arcuate slot 1c at the front side 1a of the section 1. Still further, the section 1 contains a first or rear portion 9 of a view finder the second portion 14 of which is mounted in the section 2 so as to be in register with the portion 9 when the sections 1, 2 assume the positions shown in FIGS. 2–3. The section 1 further supports a sealing device 10 movable between an operative position in which it prevents entry of scene light into the chamber 101 (via opening 22) when the sections 1, 2 assume the positions shown in FIG. 1 and an inoperative position in which the opening 22 can admit scene light into the chamber 101 in response to opening of the shutter 25. In FIG. 1, the sealing device 10 is shown in the form of an auxiliary diaphragm having several sealing elements in the form of vanes 11 which are movable relative to each other between operative and inoperative positions. FIGS. 5 and 6 show a simplified sealing device having a single sealing element or vane 10'.

The section 2 of the camera body contains the aforementioned picture taking lens 13 as well as the aforementioned shutter 25 and front portion 14 of the view finder. Still further, the section 2 contains a diaphragm 15 which is coupled to an exposure control including the parts 16 and 17. The section 2 also contains a focussing roll 18 for the picture taking lens 13 and a window 116 in front of a photoresistor forming part of the exposure control.

The rear panel of the section 2 or the outermost ring-shaped rib of the permanent magnet 21 has two arcuate slots 2b, 2c for two sleeve-like female coupling members 23, 24 which respectively receive the aforementioned pins 5, 8 in the slots 1b, 1c of the section 1 when the sections 1 and 2 assume the positions shown in FIGS. 2 and 3. The coupling member 23 is attached to a portion of the shutter 25 and cocks the latter when the user of the camera pivots the lever 4 in a direction to transport the film in the chamber 101 by the length of a frame. The pin 8 opens the shutter 25 by way of the coupling member 24 in response to displacement of the link 7 on deformation of the membrane 6. The interval during which the shutter 25 remains open can be determined electronically in a manner well known from the art and by resorting to the exposure control including the parts 16, 17 in the section 2.

The sealing element 10' of FIG. 5 is pivotably mounted on a pin 26 at or close to the front side 1a of the section 1. When the membrane 6 of the camera release is deformed (see the arrow in FIG. 5), the membrane displaces a link 27 against the opposition of a return spring 28 whereby the link 27 displaces the link 7 and pivots a lever 29 which is fulcrumed in the section 1, as at 30. The left-hand end portion of the lever 29 has a pin 29a which extends into a slot 10a of the sealing element 10' and pivots the latter from the operative position of FIG. 5 (in which the element 10' seals the opening 22 against entry of light) to an inoperative position in which the film frame behind the opening 22 can receive scene light which has passed through the lens 13. An electromagnet 33 in the section 1 is energized in response to opening of the shutter 25 to attract a portion 10a' of the sealing element 10' and to hold the latter in the inoperative position during the interval of admission of light into the chamber 101 via lens 13, diaphragm 15, shutter 25 and opening 22. The electromagnet 33 is deenergized in response to closing of the shutter 25. The energy source for the electromagnet 33 is not shown in the drawing.

The section 1 further contains a detent structure for releasably holding the sealing element 10' in the operative position of FIG. 5. The detent structure includes a pin or post 31 which can extend into a recess or notch 10b of the sealing element 10' whenever the spring 28 is free to return the element 10' to the operative position. The pin 31 is biased by a helical spring 30a (FIG. 6) so that it tends to enter the notch 10b of the sealing element 10'. The section 2 has a projection 32 which moves the post 31 axially against the opposition of the spring 30a during the last stage of movement of the section 2 to the second position shown in FIGS. 2 and 3. The pin 31 has a recess or notch 31a which is in register with the adjacent marginal portion of the sealing element 10' when the section 2 assumes the position of FIG. 2 or 3 whereby the element 10' can be moved to inoperative position in response to deformation of the membrane 6. As shown in FIG. 6, the pin 31 is reciprocable in the permanent magnet 12 of the section 1 and the projection 32 can enter a ring-shaped recess of this magnet in order to reach and displace the pin 31. If desired, the projection 32 can be mounted on an elastic arm (not shown) which is attached to the section 1 and is located in the path of movement of the section 2 to the second position of FIG. 2 or 3. As soon as the section 2 reaches such position, the pin 31 is depressed by the projection 32 against the opposition of the spring 30a to move its recess or notch 31a into register with the recess or notch 10b whereby the lever 29 can be pivoted counterclockwise in response to deformation of the membrane 6 to thereby pivot the sealing element 10' clockwise from the operative position of FIG. 5 to the inoperative position. The spring 30a is free to expand and to move the pin 31 axially so that the notch 31a is out of register with the notch 10b and the latter then receives a cylindrical portion of the pin 31 which thereby holds or locks the sealing element 10' in the operative position of FIG. 5. The pin 31 prevents the actuation of camera release when it holds the sealing element 10' in the operative position because the lever 29 is then incapable of pivoting about the pin 30.

FIG. 1 shows that the portions of the hinges 3 are located within the confines of the camera body when the section 2 assumes the first position. Each of the hinges 3 comprises a first portion 3a which is secured to the section 1 and a second portion 3b which is secured to the section 2 and is articulately connected with the portion 3a by a pin 3c. The section 1 has cutouts 1h which receive the respective portions 3a, 3b when the section 2 is moved to the position shown in FIG. 1. Furthermore, the camera may comprise helical springs 40 or analogous biasing means for urging the portions 3a to the positions shown in FIG. 3, i.e., to such positions in which the side 2a of the section abuts against the side 1a of the section 1. The springs 40 enhance the action of the magnets 12, 21 by yieldably holding the section 2 in the second position in which the camera is ready to take one or more pictures. The biasing action of springs 40 is such that they tend to maintain the picture taking lens 13 of the section 2 in exact register with the opening 22 of the section 1. An advantage of springs 40 is that they allow for gradual movement of section 2 between the positions of FIGS. 1 and 2. An advantage of such mounting of hinges 3 that they are located within the confines of the camera body is that portions of the hinges do not interfere with insertion or withdrawal of the camera body (with the sections 1 and 2 disposed end-to-end as shown in FIG. 1) from a tightly fitting casing, pocket or purse.

An important advantage of the camera is that the thickness of its sections 1 and 2 can be only a fraction of the thickness of sections in a conventional camera having a camera body of variable dimensions. This is due to the fact that the thickness of the section 2 is determined solely by the axial length of the picture taking lens 13 and the thickness of the section 1 is determined solely by the dimensions of the film chamber 101.

The improved camera is susceptible of many additional modifications. For example, and as shown in FIG. 1, the simple sealing device including the element 10' of FIGS. 5–6 can be replaced with a sealing device 10 having several sealing elements 11. Also, the means for holding the section 2 in the position of FIG. 1 or 2 may include mechanical locks in addition to or as a substitute for the permanent magnets 19, 20 or 12, 21. Still further, the camera can be provided with means for blocking the movement of lever 4 in a direction to transport the film in the chamber 101 as soon as the section 2 is moved from the second position of FIG. 2; such blocking means prevents the actuation of film transporting means when the pins 5, 8 are not received in the associated sleeves 23, 24, i.e., when the pivoting of lever 4 cannot result in cocking of the shutter 25. Still further, the camera may utilize an automatic shutter which need not be cocked by the lever 4 or by other manually operated motion transmitting means. The entire view finder can be mounted in that part of the section 1 which is not overlapped by the section 2 when the latter assumes the position shown in FIGS. 2 or 3. All such and other modifications will be readily understood upon perusal of the preceding disclosure.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

1. In a photographic apparatus, particularly in a still camera, a combination comprising a camera body including a first section and a second section, each of said sections having a first side and a second side adjacent to the respective first side; means for articulately connecting said sections with each other so that one of said sections is movable with respect to the other of said sections between a first position in which said first sides are adjacent to each other and a second position in which said second sides are adjacent to each other, said first section having a film-receiving chamber which fully confines the film in either position of said one section; and means for releasably holding said one section in at least one of said positions.

2. A combination as defined in claim 1, wherein the area of each of said second sides exceeds the area of the respective first side.

3. A combination as defined in claim 1, wherein the area of the first side of said first section equals or closely approximates the area of the first side of said second section.

4. A combination as defined in claim 1, wherein said sections are elongated and each of said first sides is located at one end of the respective section so that the length of said camera body in said first position of said one section exceeds the length of said camera body in the second position of said one section.

5. A combination as defined in claim 1, wherein said connecting means comprises at least one hinge defining a pivot axis for movement of said one section between said first and second positions.

6. A combination as defined in claim 5, wherein said hinge is located between said first and second sides of both said sections.

7. A combination as defined in claim 1, wherein said connecting means comprises at least one hinge having a first portion secured to said first section and a second portion secured to said second section and articulately coupled to said first portion, said portions of said hinge being located within the confines of said camera body in at least one position of said one section.

8. A combination as defined in claim 7, wherein said one position in which said portions of said hinge are located within the confines of said camera body is said first position of said one section.

9. A combination as defined in claim 1, wherein said first section has an opening for admission of scene light into said chamber, and further comprising a picture taking lens mounted in said second section and located in front of said opening in the second position of said one section.

10. A combination as defined in claim 1, wherein said first section has an opening for admission of scene light to said chamber, and further comprising a picture taking lens mounted in said second section and located in front of said opening in the second position of said one section, a sealing device having at least one sealing element movable between operative and inoperative positions in which said element respectively prevents and permits entry of light into said chamber by way of said opening, and means for locking said element in said operative position in the first position of said one section.

11. A combination as defined in claim 10, further comprising a camera release provided on one of said sections and means for moving said sealing element from said operative position in response to actuation of said release in the second position of said one section.

12. A combination as defined in claim 1, wherein said first section has an opening provided in said second side of said first section for admission of scene light into said chamber, and further comprising a picture taking lens mounted in said second section and located in front of said opening in the second position of said one section, and a labyrinth seal including a first portion provided at said second side of said first section and a second portion provided at said second side of said second section, said portions of said labyrinth seal cooperating with each other to prevent entry of light into said opening between said second sides of said sections in the second position of said one section.

13. In a photographic apparatus, particularly in a still camera, a combination comprising a camera body including a first section and a second section, each of said sections having a first side and a second side adjacent to the respective first side; means for articulately connecting said sections with each other so that one of said sections is movable with respect to the other of said sections between a first position in which said first sides are adjacent to each other and a second position in which said second sides are adjacent to each other, the area of the second side of said other section exceeding the area of the second side of said one section; and means for releasably holding said one section in at least one of said positions.

14. In a photographic apparatus, particularly in a still camera, a combination comprising a camera body including a first section and a second section, each of said sections having a first side and a second side adjacent to the respective first side; means for articulately connecting said sections with each other so that one of said sections is movable with respect to the other of said sections between a first position in which said first sides are adjacent to each other and a second position in which said second sides are adjacent to each other; and means for releasably holding said one section in each of said positions, including a first locking device operative to releasably maintain said one section in said first position and a second locking device operative to releasably maintain said one section in said second position.

15. In a photographic apparatus, particularly in a still camera, a combination comprising a camera body including a first section and a second section, each of said sections having a first side and a second side adjacent to the respective first side; means for articulately connecting said sections with each other so that one of said sections is movable with respect to the other of said sections between a first position in which said first sides are adjacent to each other and a second position in which said second sides are adjacent to each other, said connecting means comprising at least one hinge including a first portion secured to said first section and a second portion secured to said second section and articulately coupled to said first portion, said hinge defining a pivot axis for movement of said one section between said first and second positions and that portion of said hinge which is secured to said first section being respectively movable to third and fourth positions in response to movement of said one section to said first and second positions; means for yieldably urging said last mentioned portion of said hinge to said fourth position; and means for releasably holding said one section in at least one of said first and second positions.

16. In a photographic apparatus, particularly in a still camera, a combination comprising a camera body including a first section and a second section, each of said sections having a first side and a second side adjacent to the respective first side, said first section having a film chamber and an opening for admission of scene light to said chamber; means for articulately connecting said sections with each other so that one of said sections is movable with respect to the other of said sections between a first position in which said first sides are adjacent to each other and a second position in which said second sides are adjacent to each other; means for releasably holding said one section in at least one of said positions; a picture taking lens mounted in said second section and located in front of said opening in the second position of said one section; a sealing device having at least one sealing element movable between operative and inoperative positions in which said element respectively prevents and permits entry of light into said chamber by way of said opening; and means for locking said element in said operative position in the first position of said one section, said element being mounted in said first section and said sealing device having a recess, said locking means comprising a projection movably mounted in said first section and registering with said recess in said operative position of said sealing element, and means for biasing said projection into said recess.

17. A combination as defined in claim 16, wherein said recess is a notch in said sealing element and said projection is a pin which is reciprocable in said first section.

18. A combination as defined in claim 16, further comprising means for expelling said projection from said recess in response to movement of said one section from said second position.

19. A combination as defined in claim 18, wherein said projection has a recess which is located in the path of movement of said sealing element in the second position of said one section so as to allow said sealing element to move between said operative and inoperative positions on movement of said one section to said second position.

20. In a photographic apparatus, particularly in a still camera, a combination comprising a camera body including a first section and a second section, each of said sections having a first side and a second side adjacent to the respective first side, said first section having a film chamber and an opening for admission of scene light to said chamber; means for articulately connecting said sections with each other so that one of said sections is movable with respect to the other of said sections between a first position in which said first sides are adjacent to each other and a second position in which said second sides are adjacent to each other; means for releasably holding said one section in at least one of said positions; a picture taking lens mounted in said second section and located in front of said opening in the second position of said one section; a sealing device having at least one sealing element movable between operative and inoperative positions in which said element respectively prevents and permits entry of light into said chamber by way of said opening; means for locking said element in said operative position in the first position of said one section; a camera release provided on one of said sections; and means for moving said sealing element from said operative position in response to actuation of said release in the second position of said one section, said moving means comprising a device which prevents the actuation of said release in the first position of said one section.

21. In a photographic apparatus, particularly in a still camera, a combination comprising a camera body including a first section and a second section, each of said sections having a first side and a second side adjacent to the respective first side, said first section having a film chamber and an opening for admission of scene light to said chamber; means for articulately connecting said sections with each other so that one of said sections is movable with respect to the other of said sections between a first position in which said first sides are adjacent to each other and a second position in which said second sides are adjacent to each other; means for releasably holding said one section in at least one of said positions; a picture taking lens mounted in said second section and located in front of said opening in the second position of said one section; a sealing device having at least one sealing element movable between operative and inoperative positions in which said element respectively prevents and permits entry of light into said chamber by way of said opening; means for locking said element in said operative position in the first position of said one section; a shutter in said second section; a camera release provided on said camera body and being actuatable to open said shutter in the second position of said one section; electromagnet means energizable in response to actuation of said release to thereby retain said sealing element in the inoperative position while said shutter permits scene light to enter said chamber by way of said lens and said opening; and means for moving said sealing element to said inoperative position in response to actuation of said release.

22. A combination as defined in claim 21, further comprising means for moving said sealing element to said inoperative position in response to actuation of said release.

23. In a photographic apparatus, particularly in a still camera, a combination comprising a camera body including a first section and a second section, each of said sections having a first side and a second side adjacent to the respective first side, said first section having a film chamber and an opening provided in said second side of said first section for admission of scene light into said chamber; means for articulately connecting said sections with each other so that one of said sections is movable with respect to the other of said sections between a first position in which said first sides are adjacent to each other and a second position in which said second sides are adjacent to each other; means for releasably holding said one section in at least one of said positions; a picture taking lens mounted in said second section and located in front of said opening in the second position of said one section; and a labyrinth seal including a first portion provided at said second side of said first section and a second portion provided at said second side of said second section, said portions of said labyrinth seal cooperating with each other to prevent entry of light into said opening between said second sides of said sections in the second position of said one section, said portions of said labyrinth seal including magnets of opposite polarities and forming part of said holding means.

24. In a photographic apparatus, particularly in a still camera, a combination comprising a camera body including a first section and a second section, each of said sections having a first side and a second side adjacent to the respective first side; means for articulately connecting said sections with each other so that one of said sections is movable with respect to the other of said sections between a first position in which said first sides are adjacent to each other and a second position in which said second sides are adjacent to each other; and means for releasably holding said one section in at least one of said positions, including a first magnet of first polarity at the first side of said first section and a second magnet of opposite polarity at the first side of said second section.

25. In a photographic apparatus, particularly in a still camera, a combination comprising a camera body including a first section and a second section, each of said sections having a first side and a second side adjacent to the respective first side, said first section having a film chamber and an opening for admission of scene light into said chamber; means for articulately connecting said sections with each other so that one of said sections is movable with respect to the other of said sections between a first position in which said first sides are adjacent to each other and a second position in which said second sides are adjacent to each other; means for releasably holding said one section in at least one of said positions; a sealing device mounted in said first section and movable between operative and inoperative positions in which said sealing device respectively seals and exposes said opening; a picture taking lens mounted in said second section and located in front of said opening in the second position of said one section; a view finder including a first portion in said first section and a second portion mounted in said second section and registering with said first portion in the second position of said one section; a shutter mounted in said second section; an adjustable diaphragm mounted in said second section; a member movably mounted on said first section; means for cocking said shutter on movement of said member in the second position of said one section; a camera release mounted on said first section; and means for opening said shutter in response to actuation of said release in the second position of said one section.

26. A combination as defined in claim 25, wherein said cocking means includes a coupling having first and second portions which are respectively mounted in said first and second sections and engage with each other in the second position of said one section.

27. A combination as defined in claim 26, wherein said shutter opening means includes a coupling having first and second portions which are respectively mounted in said first and second sections and engage each other in the second position of said one section.

* * * * *